United States Patent
Kamada

(10) Patent No.: US 7,228,038 B2
(45) Date of Patent: Jun. 5, 2007

(54) PLASTIC OPTICAL FIBERS AND PROCESSES FOR PRODUCING THEM

(75) Inventor: Kou Kamada, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/562,827

(22) PCT Filed: Jul. 8, 2004

(86) PCT No.: PCT/JP2004/010058

§ 371 (c)(1),
(2), (4) Date: May 17, 2006

(87) PCT Pub. No.: WO2005/006037

PCT Pub. Date: Jan. 20, 2005

(65) Prior Publication Data

US 2006/0228082 A1    Oct. 12, 2006

(30) Foreign Application Priority Data

Jul. 11, 2003    (JP)    ............... 2003-273272

(51) Int. Cl.
G02B 6/02     (2006.01)
G02B 6/032    (2006.01)
G02B 6/00     (2006.01)
G02B 6/10     (2006.01)
B29D 11/00    (2006.01)

(52) U.S. Cl. ............... 385/123; 385/11; 385/125; 264/1.24

(58) Field of Classification Search ............... 385/123, 385/11, 125; 264/1.24
See application file for complete search history.

(56) References Cited

U.S. PATENT DOCUMENTS 6,871,000 B1 *   3/2005   Fukuba et al. ............... 385/143
2003/0085387 A1* 5/2003   Fujiyama et al. ........... 252/582

FOREIGN PATENT DOCUMENTS

| JP | 6333705 A | | 12/1994 | |
|----|-----------|---|---------|---|
| JP | 8201637 A | | 8/1996 | |
| JP | 10245410 A | * | 9/1998 | ............... 385/122 |
| JP | 11337745 A | | 12/1999 | |
| JP | 2001519857 A | | 10/2001 | |
| JP | 2002116327 A | | 4/2002 | |
| JP | 2004212711 A | | 7/2004 | |
| WO | WO 200120376 A1 | | 3/2001 | |

OTHER PUBLICATIONS

El-Bakary, M.A. Determination of Refractive Index Profile of Partially and Highly Oriented Fibers Using Double Refracting Interference Microscopy. Journal of Applied Polymer Science, Apr. 1, 2003, vol. 87, No. 14, p. 2341-2347.

(Continued)

*Primary Examiner*—Frank G. Font
*Assistant Examiner*—Jerry Martin Blevins
(74) *Attorney, Agent, or Firm*—Sughrue Mion, PLLC

(57) ABSTRACT

A novel optical plastic fiber comprising a core region and having a center line along a longitudinal axis of the fiber is disclosed. The refractive index of the core region increases along a direction going from a periphery portion to the center line in any plane perpendicular to the center line, and the birefringence index of the core region varies along a direction going from the center line to a periphery portion perpendicular to the center line in any plane parallel to the center line and containing the center line.

12 Claims, 7 Drawing Sheets

OTHER PUBLICATIONS

Huijts, R. A. et al. The Relation between Molecular Orientation and Birefringence in PET and PEN Fibers. Polymer, 1994, vol. 35, No. 14, p. 3119-3121.

Dugas, J. Birefringence and Internal Stress in Polystyrene Optical Fibers. Applied Optics, Jun. 1, 1994, vol. 33 No. 16, p. 3545-3548.

* cited by examiner

PLASTIC OPTICAL FIBERS AND PROCESSES FOR PRODUCING THEM

TECHNICAL FIELD

The present invention relates to optical plastic fibers capable of propagating high-frequency signals having a bandwidth of higher than 10 GHz·m, and more specifically relates to graded-index (GI) type multimode plastic optical fibers improved in robustness and producing cost compared with the conventional GI type multimode plastic optical fibers.

RELATED ARTS

In the field of glass optical fibers, multimode is used as a mode of fibers capable connecting in the form of large diameter, and especially in the field of plastic optical fibers, multimode is used frequently as a basic mode. A plastic optical fiber, hereinafter occasionally referred as "POF" is slightly inferior to quartz-base fiber since the entire region of the element fiber thereof is made of plastic material and has, as a consequence, a little larger transmission loss, but superior to the quartz-base optical fiber in that having an excellent flexibility, lightweight property, workability, better applicability in preparing a large bore diameter fiber and a lower cost. The plastic optical fiber is thus studied as a transmission medium for optical communication which is effected over a distance relatively as short as allowing such large transmission loss to be ignored.

A plastic optical fiber generally has a center core (referred to as "core region" in the specification) made of an organic compound and comprises a polymer matrix, and an outer shell (referred to as "clad region" in the specification) made of an organic compound having a refractive index differing from (generally lower than) that of the core region. A POF having a core region formed of a uniform composition is called step-index type POF, some are commercially available and almost of all can support a bandwidth range smaller than 10 GHz·m. On the other hand, a graded-index POF, hereinafter occasionally referred to as "GI-POF", comprising a core region having a refractive index varying along a direction going from the center to the outside thereof, disclosed in JPA No. 1986-130904 (the term "JPA" as used herein means an "unexamined published Japanese patent application), Japanese patent No. 3332922 or the like, recently attracts a good deal of attention as an optical fiber which can ensure a high transmission capacity. As one process for producing such GI-POF, it has been proposed a process comprising forming a fiber base member (referred to as "preform" in the specification) by using an interfacial gel polymerization and then drawing the preform. According to the process, an controlling agent having a high refractive index is added to a material for a matrix, the rate of the controlling agent in the matrix is gradually radially changed, and thus a desired distribution in refractive index can be obtained.

However, according to the above mentioned process for producing GI type optical plastic fibers, an accurate reaction control is required for producing a preform, and it is difficult to control reaction conditions during producing. Especially, according to the process disclosed in JPA No 1986-130904, using interfacial-gel polymerization, it takes a long time to develop a preform gradually radially, and size such as length or diameter of the obtained preform may be limited. It is thus difficult to reduce the production cost for a step of producing a preform or a step of drawing the preform. And, according to the above mentioned process, a preform having a distribution in refractive index is formed of a combination of a low-molecular weight compound having a high refractive index and a material for a matrix, and the distribution is required not to change for a long time at various temperature ranges, from the viewpoint of quality assurance. However, the present inventors conducted various studies about combinations of a low-molecular weight compound having a high refractive index and a material for a matrix, and as a result, they found that that there were limited numbers of the combinations capable of satisfying requirements of quality assurance. Although preforms having a distribution in refractive index can be produced by copolymerization of plural polymerizable monomers having a different refractive index each other in the same manner as the above process, they also found that some preforms produced by copolymerization show large light loss due to interfacial mismatch or the like, and that there was narrow choice of materials.

An object of the present invention is to provide a novel optical fiber excellent not only in frequency bandwidth but also in long-term stability and temperature-humidity stability. Another object of the present invention is to provide a GI-type optical fiber which can be produced at lower cost in a shorter time compared with conventional GI-type optical fibers.

In order to provide such a GI-type optical fiber, the present inventors conducted various studies, and as a result, they found that it was necessary to make a substantial change in a process for creating a refractive index profile to thereby enable a step of producing a preform to be carried out simply and rapidly, and to create a refractive index profile to be hardly disordered compared with a refractive index profile based on a concentration-distribution of a low-molecular weight compound having a high refractive index in a matrix material having a low refractive index, which may be easily disordered due to loss of compatibility between the plural materials. They also found that an optical fiber having a refractive index profile based on a molecular-alignment-distribution in a core region, which is different from a known refractive index profile based on a composition-distribution in a core region, can solve the aforementioned problems. On the basis of these findings, the present invention was achieved.

In one aspect, the present invention provides an optical plastic fiber comprising a core region and having a center line along a longitudinal axis of the fiber, in any plane perpendicular to the center line, a refractive index of the core region increasing along a direction going from a periphery portion to the center line, and in any plane parallel to the center line and containing the center line, a birefringence index varying along a direction going from the center line to a periphery portion perpendicular to the center line.

As embodiments of the present invention, there are provided the optical plastic fiber wherein the core region is formed of a material having a positive intrinsic birefringence, in any plane parallel to a propagating direction and containing the center line, an absolute value of a birefringence index $\Delta n$, $\Delta n = n_x - n_y > 0$, where $n_x$ is a refractive index parallel to the longitudinal axis and $n_y$ is a refractive index perpendicular to the longitudinal axis, increases along a direction going from the center line to a periphery portion perpendicular to the center line; the optical plastic fiber wherein the core region is formed of a material having a negative intrinsic birefringence, in any plane parallel to a propagating direction and containing the center line, an absolute value of a birefringence index $\Delta n$, $\Delta n = n_x - n_y < 0$, where nx is a refractive index parallel to the longitudinal axis and ny is a refractive index perpendicular to the longitudinal axis, decreases along a direction going from the center line to a periphery portion perpendicular to the center line; the optical plastic fiber wherein the core region is formed of a uniform composition; and the optical plastic fiber wherein molecules in the core region are aligned along the longitudinal axis and a degree of the alignment changes along a direction going from the center line to a periphery portion perpendicular to the center line.

In another aspect, the present invention provides a process for producing an optical plastic fiber comprising drawing a preform comprising at least one region formed of a material having an intrinsic birefringence into fiber while passing the preform through at least two zones where a temperature is set to be different each other, thereby creating a temperature-difference of 5° C. or larger between a central portion and a periphery portion of the preform before the preform is drawn into fiber.

As embodiments of the present invention, there are provided the process wherein the preform comprises a core region formed of a material having a positive birefringence index, the drawing is carried out by a drawing apparatus comprising a multistage heating zone, while at first the preform going through a zone in which the preform is heated to a drawing-temperature, subsequently going through a zone in which the preform starts to be drawn and changes shape into cone, and subsequently going through a zone in which the preform is cooled rapidly by being applied a cold wind before being drawn into fiber, thereby creating a temperature-difference of 20° C. or larger between a center portion and a periphery portion; and the process wherein the preform comprises a core region formed of a material having a negative birefringence index, the drawing is carried out by a drawing apparatus comprising a multistage heating zone, while at first the preform going through a zone in which the temperature is set to 30° C. or lower, and after that going through a zone in which the preform is heated rapidly up to a drawing temperature, thereby creating a temperature-difference of 20° C. or larger between a periphery potion portion and a center portion.

The multimode optical fiber of the present invention can be produced by creating a retardation distribution in any plane parallel to the light-propagating direction and containing the center line along the longitudinal axis of the fiber, thereby causing a refractive index distribution, which is required for improvement in optical fiber bandwidth, in any plane perpendicular to the light-propagating direction. According to the present invention, multimode optical fibers can be produced by using a uniform composition, and the refractive index profile may be hardly disordered due to temperature and humidity variations compared with the conventional refractive index profile based on the distribution in composition. Furthermore, for producing the optical fiber of the present invention, it is not required to carry out any complicated steps such as a interfacial-gel polymerization which is carried out to create the refractive index profile based on the distribution in composition, and it is merely required to carry out a simple step such as drawing a preform under a condition so that the temperature-difference between the center and the periphery portions is created and thereby the non-uniformity in molecular orientation is created. The present invention thus can contribute to remarkably reducing times and costs for producing optical fibers.

DETAILED DESCRIPTION OF THE INVENTION

The embodiments of the present invention are described in detail bellow. At first, the relationship between a refractive-index-distribution in any plane perpendicular to the longitudinal axis of the fiber and a birefringence-index-distribution in any plane parallel to the longitudinal axis in the optical fiber of the present invention will be explained.

Generally, a refractive-index-ellipsoid, which is a function of three-dimensional refractive-index components (nx, ny, nz), for a material having an intrinsic birefringence keeps a true spherical shape when molecules of the material are not oriented. In such a situation, the equation, nx=ny=nz, is satisfied, and this refractive index is referred to as $n_0$. On the other hand, when molecules of the bulk material are oriented in any direction, all of the three-dimensional refractive-index components (nx, ny, nz) are not same, or in other words birefringence is caused in the material.

When molecules of a material having a positive intrinsic birefringence are oriented along only x-axis, the refractive index for light rays with their vibrating direction parallel to the orientation direction, namely nx, becomes to be larger than $n_0$, and the refractive index for light rays with their vibrating direction perpendicular to the orientation direction, namely ny which is equal to nz, becomes to be smaller than $n_0$. On the other hand, when molecules of a material having a negative intrinsic birefringence are oriented along only x-axis, the refractive index for light rays with their vibrating direction parallel to the orientation direction, namely nx, becomes to be smaller than $n_0$, and the refractive index for light rays with their vibrating direction perpendicular to the orientation direction, namely ny which is equal to nz, becomes to be larger than $n_0$.

Figure 1:
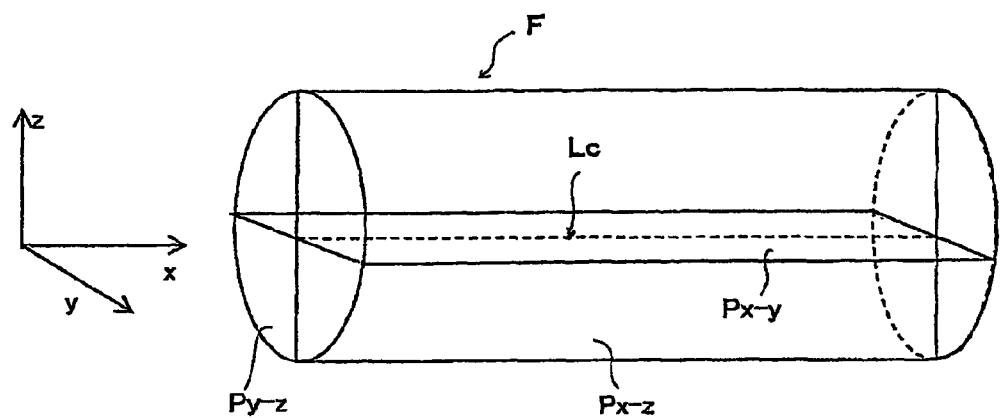
FIG. 1 is a schematic view of a model used for explanation of the optical fiber of the present invention.
Figure 2:
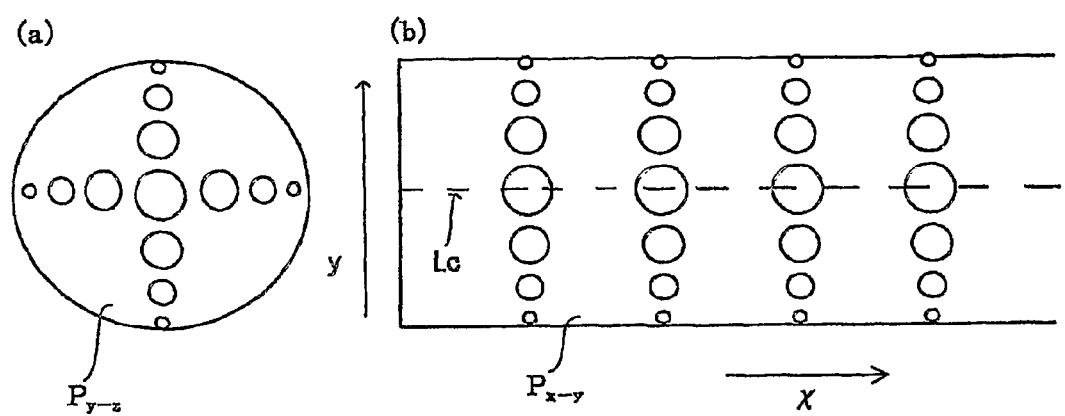
FIG. 2 is a diagrammatic view describing a refractive index ellipsoid for an example of the optical fiber disclosed in Japanese Patent No. 3332922.
Figure 3:
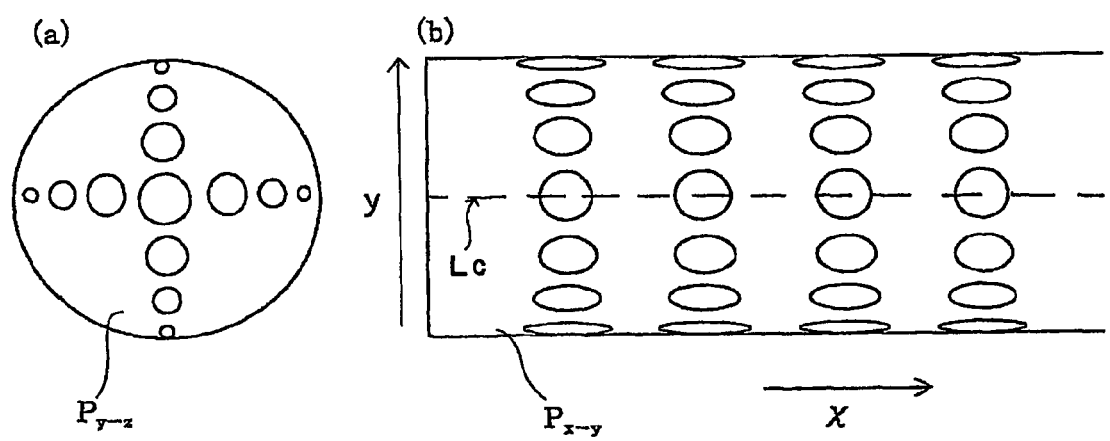
FIG. 3 is a diagrammatic view describing a refractive index ellipsoid for an example of the optical fiber of the present invention, comprising a core region formed of a material having a positive intrinsic birefringence.
Figure 4:
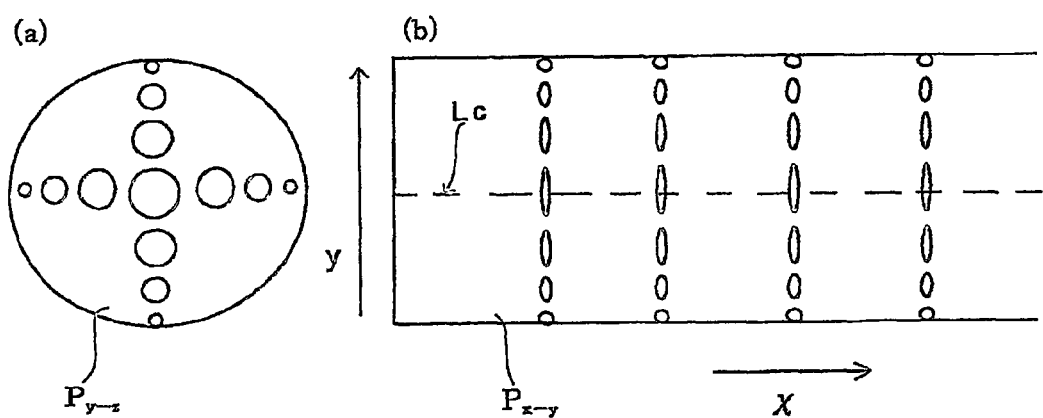
FIG. 4 is a diagrammatic view describing a refractive index ellipsoid for an example of the optical fiber of the present invention, comprising a core region formed of a material having a negative intrinsic birefringence.

A model of a core region of a long optical fiber disposed in orthogonal coordinate space (x, y, z), whose longitudinal axis parallel to x-axis, as shown in FIG. 1, will be considered. In FIG. 1, a plane $P_{y-z}$ is perpendicular to the longitudinal axis of the optical fiber, and a plane $P_{x-y}$ contains a center line $L_c$ along the longitudinal axis and is parallel to the longitudinal axis. FIGS. 2 to 4 show diagrammatic refractive-index-ellipsoids for various optical fibers in $P_{y-z}$ section and in $P_{x-y}$ section respectively. It is to be noted that diagrammatic refractive-index-ellipsoids in $P_{x-z}$ section, which is the other plane containing the center line $L_c$ and being parallel to the longitudinal axis, are not shown because they are same as those in $P_{x-y}$ section respectively.

FIG. 2 shows a diagrammatic refractive-index-ellipsoid for a core region of a conventional GI-POF such as described in Japanese Patent No. 3332922 in $P_{y-z}$ section (FIG. 2 (a)), which is defined in nz and ny components, and in $P_{x-y}$ section (FIG. 2 (b)), which is defined in nx and ny components. The conventional GI-POF such as shown in FIG. 2 has a graded refractive index profile based on a graded concentration profile of low-molecular weight compound having a high refractive index in a matrix material. Accordingly, as shown in FIG. 2(a), the diagrammatic refractive index ellipsoids in $P_{y-z}$ section can be described as circle, and the dimensions of the circles decrease along a direction going from the center portion to the periphery portion. And as shown in FIG. 2(b), the shapes of the diagrammatic refractive index ellipsoids in $P_{x-y}$ section are similar in the center and periphery portions, and the dimensions of the circles decrease along a direction going from the center portion to the periphery portion as well as in $P_{y-z}$ section.

FIG. 3 shows a diagrammatic refractive-index-ellipsoid for a core region of a GI-POF of the present invention in $P_{y-z}$ section (FIG. 3 (a)), which is defined in nz and ny components, and in $P_{x-y}$ section (FIG. 3 (b)), which is defined in nx and ny components. The core region shown in FIG. 3 is formed of a material having a positive intrinsic birefringence, and molecules of the material are oriented along the longitudinal axis (x-axis) more intensively as being far from the center portion and being near to the periphery portion (along y-axis). The orientation degree of the molecules in $P_{x-y}$ plane increases along a direction going from the center line $L_c$ to the periphery portion, and the dimension of nx component increases with the variation of the orientation degree. And, as shown in FIG. 3(b), the shape of the diagrammatic refractive index ellipsoid in $P_{x-y}$ section approaches a rugby-ball-like shape having a longitudinal axis along x-axis as being far from the center portion and being near to the periphery portion. As a result such a variation of the orientation degree in $P_{x-y}$ plane can cause a relative refractive index profile in $P_{y-z}$ plane in which the refractive index decreases along a direction going from the center potion to the periphery portion. It may be understood that, for the light propagating direction, the refractive index profile found in the core region shown in FIG. 3 is equal to that found in the core region of the conventional GI-POF, which is produced by creating a graded refractive index profile in a refractive-index-isotropic material.

FIG. 4 shows a diagrammatic refractive-index-ellipsoid for another core region of a GI-POF of the present invention in $P_{y-z}$ section (FIG. 4 (a)), which is defined in nz and ny components, and in $P_{x-y}$ section (FIG. 4 (b)), which is defined in nx and ny components. The core region shown in FIG. 4 is formed of a material having a negative intrinsic birefringence, and molecules of the material are oriented along the longitudinal axis (x-axis) more intensively as being far from the periphery portion and being near to the center portion (along y-axis). The orientation degree of the molecules in $P_{x-y}$ plane increases along a direction going from the periphery portion to the center line $L_c$, and the dimension of nx component decreases with the variation of the orientation degree. And, as shown in FIG. 4(b), the shape of the diagrammatic refractive index ellipsoid in $P_{x-y}$ section approaches a disk-like shape having a longitudinal axis along y-axis as being far from the periphery portion and being near to the center portion. As a result such a variation of the orientation degree in $P_{x-y}$ plane can cause a relative refractive index profile in $P_{y-z}$ plane in which the refractive index decreases along a direction going from the center potion to the periphery portion. It may be understood that, for the light propagating direction, the refractive index profile found in the core region shown in FIG. 4 is equal to that found in the core region of the conventional GI-POF, which is produced by creating a graded refractive index profile in a refractive-index-isotropic material.

As described above, according to the present invention, it is not necessary to intentionally produce non-uniformity in composition of the material in order to produce a core region having a graded refractive index, and materials having uniformity in composition can be used for producing the core region. It is to be noted that in the specification, the term of "material having uniformity in composition" is used for any materials consisting of a single component but also for any materials comprising plural components and having uniformity in component ratio without composition bias depending on region. According to the present invention, the core region may therefore be formed of a single-component material having an intrinsic birefringence or a multi-component material such as a material prepared by dispersing a dopant (additive component) having an intrinsic birefringence uniformly into a matrix material not having any birefringence or a material prepared by copolymerization of a matrix material not having any birefringence and a dopant (additive component) having an intrinsic birefringence. The dopant may be selected from non-polymerizable or polymerizable low-molecular-weight compounds.

Figure 5:
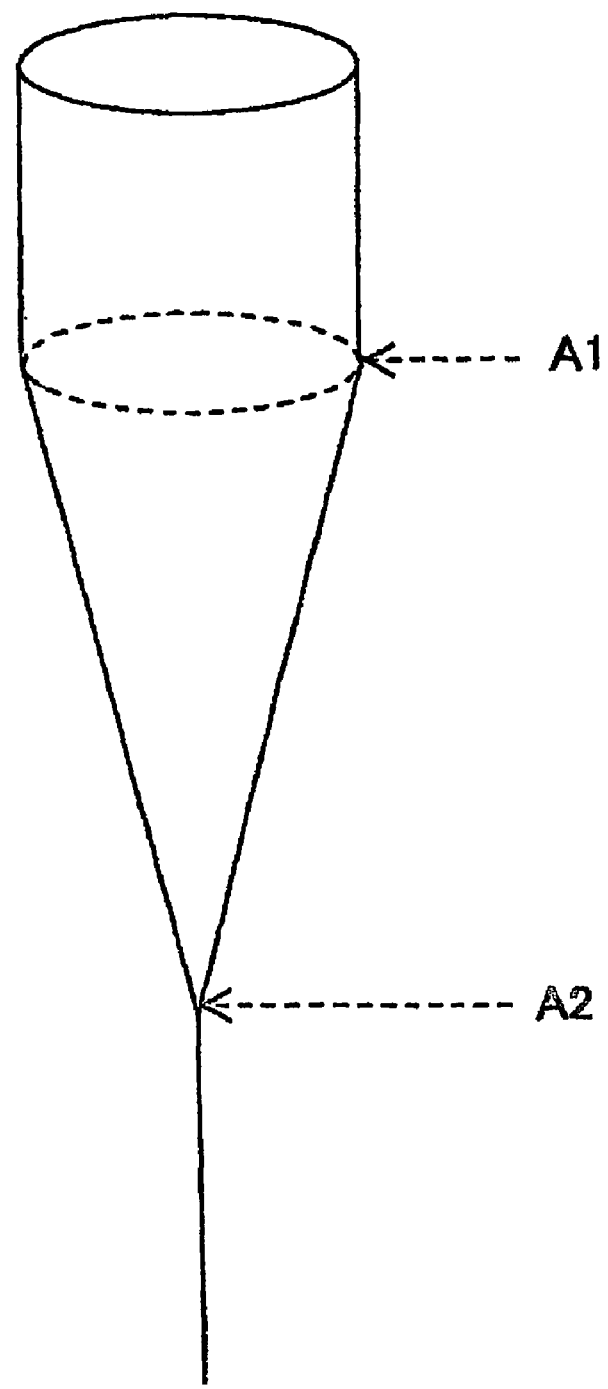
FIG. 5 is a schematic view of a drawn cone forming during a drawing step.
Figure 9:
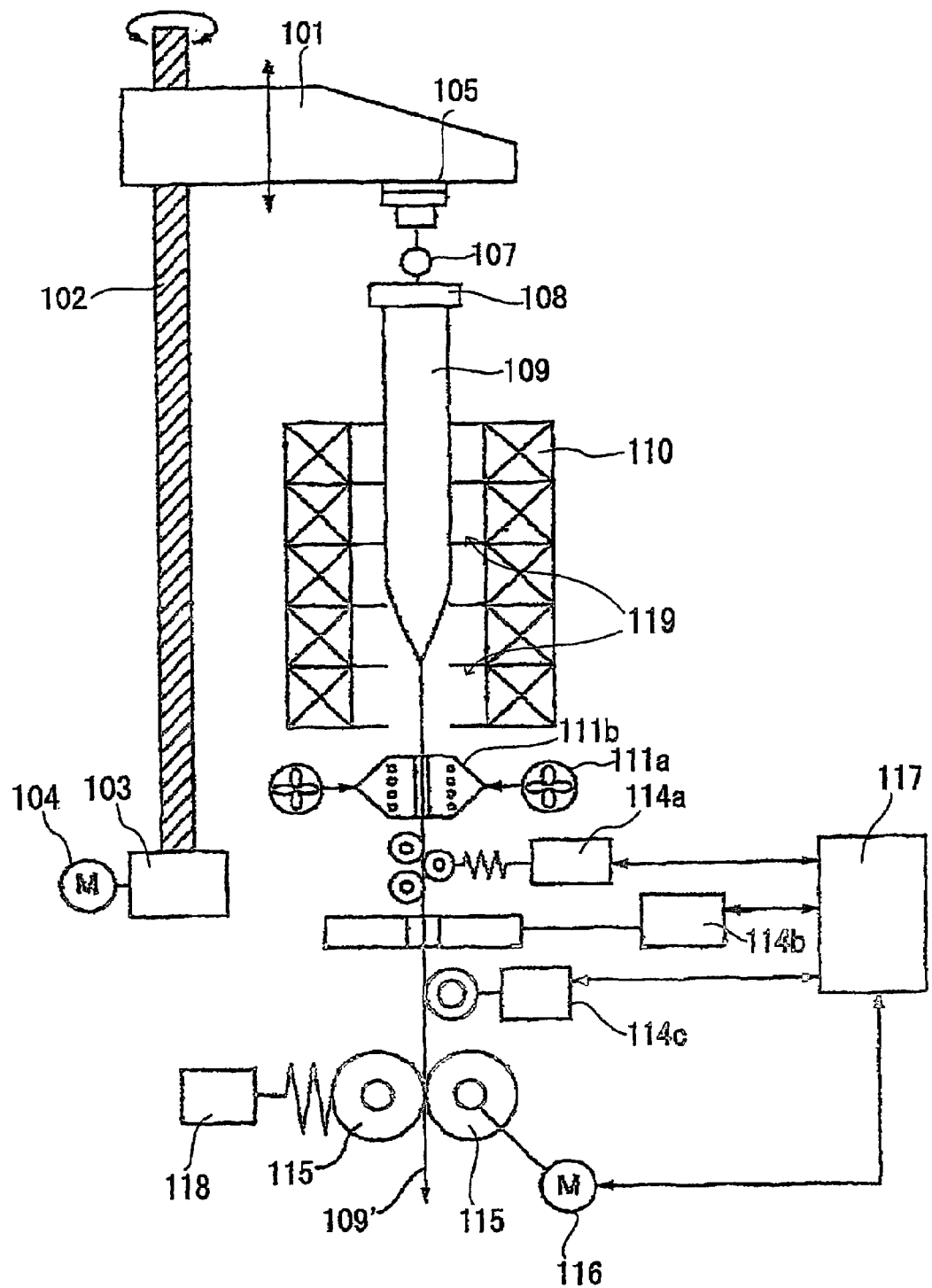
FIG. 9 is a schematic sectional view of an exemplary drawing apparatus used for producing an optical fiber of the present invention.

As described above, a birefringence index profile in which a birefringence index varies in a plane perpendicular to the longitudinal axis can be formed by orienting molecules along the longitudinal axis and creating the difference in orientation degree between at the center and periphery portions. One simple way for creating the difference in orientation degree between at the center and periphery portions is to create the temperature-difference between the center and the periphery portions when drawing is carried out. For example, when a cylindrical preform is drawn into fiber, the preform in molten state may be pulled downstream, so that its diameter may decrease along the drawing direction gradually and may substantially change shape into cone as shown in FIG. 5 (a preform substantially changing shape into cone is occasionally referred to as "drawn cone" hereinafter). According to the present invention, it is preferred that there is a temperature-difference of 5° C. or larger between the center and periphery potions of a preform at least one point selected from the region from a starting point A1, at which a preform-diameter starts to decrease, to an terminal point A2, at which the preform-diameter reaches a fiber-diameter; and more preferred that there is a temperature-difference of 20° C. or larger. It is therefore preferred that a preform is drawn by a drawing apparatus, as shown in FIG. 9, having plural compartments in which the temperature can be controlled respectively (referred to as "a drawing apparatus having multistage heating-zone" hereinafter) because the temperature-difference between the center and periphery portions can be created easily.

Drawing a preform comprising a core region formed of a material having a positive intrinsic birefringence, it is necessary to create a condition in which molecules in the core are oriented along the longitudinal axis more intensively as being far from the center portion and being near to the periphery portion. In order to create such a condition in the preform, the temperature in the periphery portion may be set to a temperature which is lower than that in the center portion and is high enough to allow molecules in the periphery portion to orient while drawing the preform is carried out. Being drawn by the drawing apparatus having a multi stage heating zone as shown in FIG. 9, the preform may be preheated gradually while going through the first, second and third compartments, start to be drawn while going through the fourth compartment and be applied a cold wind while going through the fifth compartment, where the drawn cone is drawn thin gradually, so that only the periphery portion can be cooled rapidly.

Drawing a preform comprising a core region formed of a material having a negative intrinsic birefringence, it is necessary to create a condition in which molecules in the core region are oriented along the longitudinal axis more intensively as being far from the periphery portion and being near to the center portion. In order to create such a condition in the preform, the temperature in the center portion may be set to a temperature which is lower than that in the periphery portion and is high enough to allow molecules in the center portion to orient while drawing the preform is carried out. Or in other words, the preform may be required to be heated from the outside by powerful electrothermal heating in the heating zone, so that only the temperature in the periphery portion can be heated rapidly. More specifically, being drawn by the drawing apparatus having a multi stage heating one as shown in FIG. 9, the preform may be rather cooled than preheated while going through the first and second compartments and be heated rapidly while going through third compartment, so that the temperature in the periphery portion can be set to higher than that in the center portion.

The desired range of the temperature-difference in drawing may vary depending on types of the material to be used, and in usual, in order to create the difference in orientation degree, the temperature difference desirably falls within a range from 5° C. to 150° C., more desirably from 10° C. to 100° C., and much more desirably from 20° C. to 75° C. When the temperature-difference is smaller than 5° C., the refractive index profile may be insufficient for a GI-POF. And when the temperature-difference is larger than 150° C., some preforms may be melted only at the periphery portion and keep hardness at the center portion, so that they cannot be drawn.

As described above, according to the present invention, the refractive index profile in any plane perpendicular to the longitudinal axis is caused relatively in a core region, which is formed of an intrinsic-birefringence material having uniformity in composition, by creating non-uniformity of molecular orientation in the core region, and such non-uniformity of molecular orientation may be caused by drawing the preform while the temperature in the core region varying along a direction going from the center portion from the periphery portion. The optical fiber of the present invention can thus propagate high bandwidth light, can be produced with a low cost, and is improved in temperature-humidity robustness.

One embodiment of the present invention relates to an optical fiber comprising a core region having the above mentioned properties and a clad region cladding the core region. The core and clad regions may respectively be formed of a polymer obtained by polymerization of a polymerizable composition comprising at least one polymerizable monomer. Examples of the various materials which can be used for producing the core or clad region will be described below.

[Polymerizable Monomer]

The polymerizable monomer used as material for the core region is desirably selected from polymerizable monomers capable of forming a polymer having a high transparency and a high thermoplasticity. Examples of such polymerizable monomers include (meth)acrylates such as (a) (meth)acrylates not containing fluorine and (b) (meth) acrylates containing fluorine, (c) styrenes, (d) vinyl esters and (e) carbonic esters. The core region may be formed of a homopolymer of one monomer selected from them, a copolymer of two or more monomers selected from them or a mixture of the homopolymers and/or the copolymers. Especially, according to the present invention, the monomer is desirably selected from polymerizable monomers capable of easily forming a birefringent polymer. Examples of a positive birefringent polymer or a monomer capable of forming such a polymer include polycarbonate and benzyl methacrylate, examples of a monomer capable of forming a negative birefringent polymer include methyl methacrylate, styrene, α-styrene, chlorostyrene and bromostyrene, and the monomer is desirably selected from these examples. Intrinsic birefringence of a polymerizable monomer can be determined by measuring a birefringence of a sample obtained by uniaxially stretching a polymer formed of the monomer. However, according to the present invention, any materials capable of forming birefringence can be used as a material for the core region and thus the monomer is not limited to the above exemplified monomers. The types of the monomer may be decided such that the homopolymer formed of the monomer has a refractive index not lower than that of the clad region, or the composition ratio of two or more monomers may be decided such that the copolymer formed of the combination of the monomers has a refractive index not lower than that of the clad region.

When the optical member is used for propagating near-infrared light, light may be lost due to absorption by C—H bond in the optical fiber during propagating. In order to shift the absorption toward longer wavelengths and to thereby reduce such light loss, it is preferred that the core is formed of at least one polymer selected from deuterated or fluorinated polymers, in which hydrogen atoms are substituted with deuterium or fluorine atoms, such as deuterated polymethyl methacrylate (PMMA-dB), poly(trifluoroethyl methacrylate) (P3FMA) or poly(hexafluoroisopropyl 2-fluoroacrylate) (HFIP 2-FA) disclosed in Japanese patent No. 3332922 or the like. In order to prevent transparency from lowering after polymerization, it is preferred that any contaminations or any foreign matters regarded as a potential cause of scattering are removed sufficiently from the monomer before polymerization.

The monomer may be selected from (meth)acrylates having a cycloaliphatic hydrocarbon or branched-chain hydrocarbon group in side chain. The polymers containing a segment derived from the monomer in a large amount have a brittleness and a little lower stretchability compared with (meth)acrylates not having the group such as polymethyl methacrylate (PMMA). Thus, using the monomer having a cycloaliphatic hydrocarbon or branched-chain hydrocarbon group in side chain, in order to offset the brittleness, another monomer having a high plasticity may be copolymerized with the monomer on the condition that the obtained property is not lower than desired, or the clad region or a coating layer, which is optionally disposed at the outer side of the clad region, may be formed of fluorocarbon rubber.

The clad region may be formed of a polymer having a lower refractive index than that of the core region, being amorphous and having a good adhesion with the core region so that light propagating through the core region can be totally reflected back into the core region at interface between the core and clad regions. When the interfacial mismatch is likely to occur, or the refractive index profile is likely to deviate from the ideal profile shown in FIG. 3 or FIG. 4, at least one layer may be disposed between the core and clad regions. For example, an outer core layer, which is formed of a polymer having the same composition as that of the core matrix, may be disposed between the core and clad regions, or in other words on an inner surface of a clad tube, so that the condition of the interface between the core and clad regions can be improved. The outer core layer will be described in detail later. Instead of disposing the outer layer, the clad region itself may be formed of a polymer having the same composition as that of the core matrix. When the outer core layer is formed by rotating polymerization, polymer chains in the layer tend to form a planar alignment in which they orient along a curve surface parallel to the inner surface of the hollow tube thereby producing an index ellipsoid. This can contribute to compensating a disorder of the propagating light.

The material used in producing the clag region can be selected from the above-exemplified materials as a material for the core region, and among those, the material is desirably selected from the materials excellent in toughness and temperature and humidity stability. From this viewpoint, the clad region is desirably formed of a homopolymer of a fluorine-containing monomer or a copolymer of at least one fluorine-containing monomer. Preferred examples of the fluorine-containing monomer include vinylidene fluoride. Fluorinated homopolymers or copolymers containing a unit derived from vinyliden fluoride in 10 wt % or more are desirably used.

When the clad region is produced by melt-extrusion molding, which will be described in detail later, the polymer is required to have a proper melting viscosity. The weight-average molecular weight of a polymer can be used as a property correlating with the melting viscosity of the polymer. From the viewpoint, the polymer is desirably selected from polymers which has a weight-average molecular weight falling within the range from 10,000 to 1,000,000 and more desirably from 50,000 to 500,000.

For preventing as much water from seeping into the core region as possible, the polymer for the clad region may be selected from polymers having a low water absorption rate. The clad region may be produced by using a polymer having a saturated water absorption rate, occasionally referred to as "water absorption rate" in the specification, lower than 1.8%, desirably lower than 1.5%, and much more desirably lower than 1.0%. It is to be noted that a water absorption rate in the specification can be obtained by measuring a water absorption rate of a sample after being soaked in water at 23° C. for a week according to ASTMD570.

[Polymerization Initiator]

The polymerization initiator may be selected from known polymerizable initiators depending on various factors such as types of polymerizable monomers or types of polymerization processes. Examples of the polymerization initiator include peroxides such as benzoyl peroxide (BPO), tert-butylperoxy-2-ethylhexanate (PBO), di-tert-butylperoxide (PBD), tert-butylperoxyisopropylcarbonate (PBI) or n-butyl-4,4-bis(tert-butylperoxy)valerate (PHV); and azo compounds such as 2,2'-azobisisobuthylonitrile, 2,2'-azobis(2-methylbuthylonitrile),
1,1'-azobis(cyclohexane-1-carbonitrile),
2,2'-azobis(2-methylpropane), 2,2'-azobis(2-methylbutane),
2,2'-azobis(2-methylpentane),
2,2'-azobis(2,3-dimethylbutane), 2,2'-azobis(2-methylhexane),
2,2'-azobis(2,4-dimethylpentane),
2,2'-azobis(2,3,3-trimethylbutane),
2,2'-azobis(2,4,4-trimethylpentane),
3,3'-azobis(3-methylpentane), 3,3'-azobis(3-methylhexane),
3,3'-azobis(3,4-dimethylpentane),
3,3'-azobis(3-ethylpentane),
dimethyl-2,2'-azobis(2-methylpropionate),
diethyl-2,2'-azobis(2-methylpropionate) or
di-tert-butyl-2,2'-azobis(2-methylpropionate).

The polymerization initiator used in the present invention is not limited to those exemplified above. Two or more polymerization initiators may be used in combination.

[Chain Transfer Agent]

The core region or the clad region being produced, the polymerization of the polymerizable monomer is desirably carried out in the presence of a chain transfer agent. Chain transfer agents are mainly used in order to adjust the molecular weights of polymers to be obtained. Using a chain transfer agent in polymerization of a monomer, the polymerization rate and the polymerization degree can be controlled, so that the polymer having a desired molecular weight can be obtained. It is possible to produce the polymer to suit drawing, and the polymer being drawn for production of an optical fiber, the productivity is improved.

The chain transfer agent can be properly selected in consideration of the monomer to be employed. The chain transfer constants of the chain transfer agents for various monomers can be referred to publications such as "Polymer Handbook $3^{rd}$ edition" edited by J. BRANDRUP and E. H. IMMERGUT, published by JOHN WILEY&SON. The chain transfer constants can be also obtained by experimental tests according to methods disclosed in "Kohbunshi gousei nojikkenhou (Experimental methods for polymer synthesis)" written by Takayuki Ohtsu and Masaetsu Kinoshita, published by Kagaku-Dojin Publishing Company, INC (1972).

Examples of the chain transfer agent include alkylmercaptans such as n-butylmercaptan, n-pentylmercaptan, n-octylmercaptan, n-laurylmercaptan or tert-dodecylmercaptan; and thiophenols such as thiophenol, m-bromothiophenol, p-bromothiophenol, m-toluenethiol or p-toluenethiol. Among these, alkyl mercaptans such as n-octylmercaptan, n-laurylmercaptan or tert-dodecylmercapton are preferred. It is also possible to use the chain transfer agents in which at least a part of hydrogen atoms of C—H bonds are replaced with deuterium atoms. Two or more chain transfer agents may be used in combination.

[Other Additives]

The core region or the clad region may contain other additives in an amount falling within a range which does not allow the propagating ability to lower. For example, in order to have a refractive index much different from that of the clad region, the core region may contain a refractive-indexcontrolling agent. The core or clad region may also contain a stabilizer to have a improved weatherability or durability. It is also allowable to add an emission inductive material for amplifying light signal for the purpose of improving the light transmission property. Since even attenuated light signal can be amplified by addition of such compound to thereby elongate the length of transmission, the compound is typically applicable to produce a fiber amplifier at a part of light transmission link. After being added such additives to, the polymerizable monomer may be polymerized to form a core or clad region containing them.

Next, embodiments of the process of the present invention will be described; however, and the process of the present invention is not limited to the embodiments described below. Embodiments of processes for producing optical plastic fiber comprising a core region and a clad region will be described below.

The optical fiber of the present invention can be produced by processes comprising a step of drawing a preform of the optical fiber. The preform may be produced by extruding a polymer, polymerizing a polymerizable composition in a hollow tube to form a clad region or the like. The process comprising the latter will be mainly described below. One process of the present invention comprises a first step of producing a hollow tube corresponding to a clad region by extruding fluorine-containing polymer such as polyvinylidene fluoride, a second step of producing a preform comprising regions respectively corresponding to a core region and a clad region by polymerizing a polymerizable composition in a hollow portion of the tube to form a region corresponding to a core region, and a third step of processing the obtained preform into a desired shape. A step of producing an outer core layer on the inner surface of the hollow tube may be carried out between the first and second steps.

The Polymer, which is contained in the region corresponding to the clad region, the outer layer or the core region, is desirably selected from the group consisting of polymers having a weight-average molecular weight of 10,000 to 1000,000 and more desirably from 30,000 to 500,000. The value of MWD, which is defined as a ratio of a weight-average molecular weight to a number-average molecular weight, may influence stretchability. The extraordinary high-molecular weight ingredients in polymers having a high value of the MWD may contribute to lowering stretchability of the polymers event if the amounts of the ingredients are very small, and some of such polymers can not be drawn. The value of the MWD is thus desirably not grater than 4 and more desirably not greater than 3. Polymers having a desired MWD value can be obtained by controlling polymerization rate or polymerization degree of a polymerizable monomer with a polymerization initiator or a chain transfer agent.

In the first step, a mono-layered tube corresponding to the clad region is produced. The mono-layered hollow tube may be produced by rotational polymerization, disclosed in Japanese Patent No. 3332922, such that monomer composition is polymerized to form a hollow tube, melt-extrusion molding or the like. When the hollow tube is produced by rotational polymerization, a polymerizable composition for a clad region or for an outer layer may be poured into a cylindrical polymerization vessel or a pipe formed of a fluorine polymer, and then polymerization may be carried out while rotating (preferably while keeping the axis of the cylindrical vessel horizontally) the vessel or the pipe, referred to as "rotational polymerization", to thereby form a hollow tube having one layer made of a polymer or a hollow tube having two concentric layers. Before being poured into the vessel or the pipe, the composition may be filtered to remove powder dusts from the composition. And unless the performance is lowered or the pre-process or the post-process becomes complicated, in order to improve tractability, the composition may be prepared so as to have a proper viscosity, as described in JPA No. hei 10-293215 (1998-293215), or in order to shorten polymerization time, pre-polymerization of the composition may be carried out. The appropriate temperature and period for the polymerization may vary depending on species of the monomer or the polymerization initiator to be employed. In general, the polymerization is preferably carried out at 60 to 150 degrees Celsius for 5 to 24 hours. The composition used herein may be pre-polymerized before the polymerization so as to raise the viscosity thereof as described in JPA No. hei 8-110419 (1996-110419), so that the required period for carrying out the polymerization can be shortened. Since the obtained hollow structure may be deformative when the vessel may get distorted by rotation, it is preferable to use a metal or glass vessel having a sufficient rigidity.

The hollow tube formed of a polymer can be fabricated also by placing a pellet-formed or powdery polymer (preferably fluorine-containing resin) into a cylindrical vessel, closing the vessel at both ends, heating the vessel up to a temperature higher than the melting point of the polymer while keeping on rotating the reactor (preferably so as to keep the axis of the cylinder horizontally), to thereby allow the polymer to melt. This process is desirably carried out under an inert gas atmosphere such as nitrogen or argon gas or after the composition being dried fully, in order to avoid thermal, oxidative or thermal-oxidative decomposition caused by melting.

For the case where the clad region is formed by melt extrusion of the polymer, it is also allowable to produce the polymer, and then to obtain a structured component of a desired geometry (cylindrical form in this embodiment) by molding technique such as extrusion molding. The melt extrusion machines available herein are classified into two types, inner sizing die system and outer die vacuum suction system.

Outline of the inner sizing die system will be explained referring to FIG. 6 which is a schematic sectional view of an exemplary configuration of a melt extrusion molding machine based on the inner sizing die system.

A source polymer 40 for forming the clad region is extruded by a single screw extruder having a bent (not shown) out through a main unit 11 towards a die block 14. The die block 14 has a guide 30, inserted therein, for introducing the source polymer 40 into flow paths 40*a*, 40*b*. The source polymer 40 passes by the guide 30, flows through the flow paths 40*a*, 40*b* formed between the die block 14 and an inner rod 31, extruded out from the exit 14*a* of the die, to thereby form a cylindrical hollow clad 19. The extrusion speed of the clad 19 is not specifically limited, where it is preferably set within a range from 1 cm/min to 100 cm/min in view of shape stability and productivity.

The die block 14 is preferably equipped with a heating device for heating the source polymer 40. In one possible configuration, one or two heating devices (device using steam, heat medium oil, electric heater, etc.) are disposed so as to surround the die block 14 along the direction of advancement of the source polymer 40. On the other hand, it is preferable to attach a temperature sensor 41 at the exit 14*a* of the die, and to use the temperature sensor 41 to control the temperature of the clad 19 at the exit 14*a* of the die. The temperature is preferably adjusted not higher than the glass transition point of the source polymer 40 in view of keeping a uniform geometry of the clad 19. The temperature of the clad 19 is also preferably adjusted not lower than 40° C. in view of suppressing variation in the geometry due to abrupt temperature change. The temperature control for the clad 19 is attainable by attaching a cooling unit (device using liquid such as water, anti-freezing fluid or oil, or based on electronic cooling) to the die block 14, or by natural air cooling of the die 14. For the case where the heating device is provided to the die block, the cooling unit is preferably disposed on the downstream side of the heating device.

Figure 7:
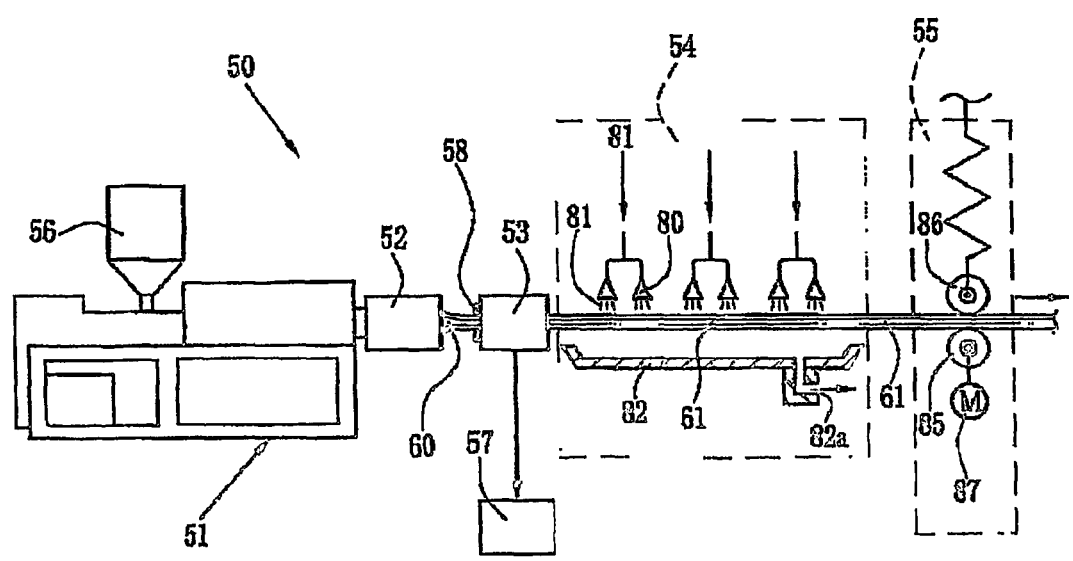
FIG. 7 is a schematic drawing of an exemplary configuration of a manufacturing line of the melt extrusion molding machine based on the outer die vacuum suction system available for the fabrication of the optical fiber in the present invention.
Figure 8:
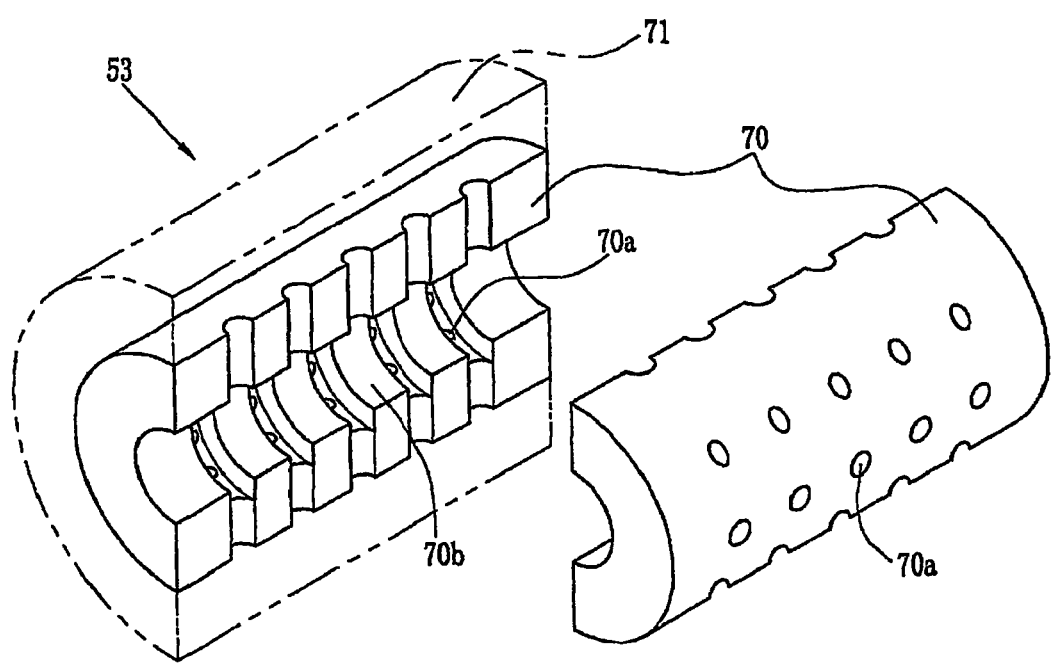
FIG. 8 is a perspective view of a molding die available for the fabrication of the optical fiber in the present invention.

Next paragraphs will describe an outline of the forming process based on the outer die vacuum suction system referring to FIGS. 7 and 8, where the former shows an exemplary configuration of a manufacturing line of the melt extrusion molding machine based on the outer die vacuum suction system, and the latter is a perspective view of a molding die 53 available therefore.

A manufacturing line 50 shown in FIG. 7 comprises a melt extrusion machine 51$a$, a pushing die 52, a molding die 53, a cooling unit 54 and drawing device 55. The source polymer charged through a pellet charge hopper (referred to as a hopper, hereinafter) 56 is melted inside the melt extrusion machine 51, extruded by the pushing die 52, and fed into the molding die 53. The extrusion speed S preferably satisfy a relation of $0.1 \leq S$ (m/min)$\leq 10$, more preferably $0.3\ S$ (m/min)$\leq 5.0$, and most preferably $0.4 \leq S$ (m/min)$\leq 1.0$, while not being limited to these ranges.

As shown in FIG. 8, the molding die 53 is equipped with a molding tube 70, through which the molten resin 60 is allowed to pass and molded to produce a cylindrical clad 61. The molding tube 70 has many suction holes 70$a$ formed thereon, and allows the outer wall surface of the clad 61 to be pressed onto the molding surface (inner wall) 70$b$ of the molding tube 70 when the reduced-pressure chamber 71 provided so as to surround the molding tube 70 is evacuated using a vacuum pump 57 (see FIG. 7), to thereby produce the clad 61 having a uniform thickness. The pressure inside the reduced-pressure chamber 71 is preferably adjusted within a range from 20 kPa to 50 kPa, while being not limiter thereto. It is preferable to attach a throat (outer diameter limiting member) 58 for limiting the outer diameter of the clad 61 at the entrance of the molding die 53.

The clad 61 after being shaped by the molding die 53 is then sent to the cooling unit 54. The cooling unit 54 has a number of nozzles 80, from which cooling water 81 is ejected towards the clad 61 to thereby cool and solidify the clad 61. It is also allowable to collect the cooling water 81 on a receiving pan 82 and to discharge through a discharge port 82$a$. The clad 61 is drawn by the drawing device 55 out from the cooling unit 54. The drawing device 55 comprises a drive roller 85 and pressurizing roller 86. The drive roller 85 is connected to a motor 87, so as to make it possible to control the drawing speed of the clad 61. The pressurizing roller 86 disposed so as to oppose with the drive roller 85 while placing the clad 61 in between makes it possible to finely correct even a slight dislocation of the clad 61. By controlling the drawing speed of the drive roller 85 and the extrusion speed of the melt extrusion molding machine 51, or by finely adjusting displacement of the clad 61, the clad 61 can be fabricated with an excellent uniformity in the geometry thereof, especially in the thickness.

The clad region may be composed of a plurality of layers so as to have a variety of functions such as improved mechanical strength and flame retardancy. It is also preferable to fabricate the hollow tube so as to have an arithmetic mean roughness of the inner wall thereof within a predetermined range, and to cover the outer surface thereof with a fluorine-containing resin or the like.

The outer diameter ($D_1$) of the resultant clad region, or in other words the outer diameter of the preform, preferably has a certain degree of length such that the temperature difference between in the core region and in the periphery region can be created intensively, in particular, preferably satisfies the relation of $20 \leq D_1$ (mm)$\leq 500$, and more preferably satisfies the relation of $25 \leq D_1$ (mm)$\leq 100$. As long as the clad region can keep the shape by itself, the thickness t of the clad region may be as thin as possible, and in usual, the thickness preferably satisfies the relation of $2 \leq t$ (mm) $\leq 20$. And the length of the preform is desirably not shorter than 200 mm and more desirably from 500 mm to 3000 mm, from the view of ensuring enough length of margins to start polymerizing or drawing stably. The present invention is, however, by no means limited to the above-described ranges.

The mono-layered or double-layered hollow cylindrical tube desirably has a bottom portion, so as that a material for the core region can be poured into the cylinder in the second step. The preferred material for the bottom portion is a material having a good affinity and adhesiveness with the polymer of the cylinder. The bottom portion may be formed of the same polymer as that of the cylinder. For example, the bottom potion can be produced by pouring a small amount of monomer into a vessel before or after carrying out rotational polymerization; and carrying out polymerization of the monomer with still standing the vessel.

In the second step, a monomer composition may be poured into the hollow portion of the obtained tube corresponding to the clad region and be polymerized. The composition may contain an additive such as a polymerization initiator or chain transfer agent. The preferable ranges of the amount of the components contained in the composition may properly be determined in consideration of species to be employed, where the additional amount of the polymerization initiator is desirably within a range from 0.005 to 0.5 wt % and more desirably within a range from 0.010 to 0.50 wt %, with respect to the weight of the polymerizable monomer composition; and the additional amount of the chain transfer agent is desirably within a range from 0.10 to 0.40 wt %, and more desirably within a range from 0.15 to 0.30 wt %, with respect to the weight of the polymerizable monomer composition.

In the second step, the polymerization may be carried out under increased pressure as described in JPA No. hei 9-269424 (1997-269424), under reduced pressure as described in Japanese patent No. 3332922, or while the pressure is varied according to circumstances Such control of pressure may contribute to improving in polymerization efficiency of a monomer at a temperature close to a boiling point of the monomer. When the polymerization is carried out under pressure therein after referred as "pressurized polymerization"), it is preferable to place the mono-layered or double-layered cylinder in the hollow space of a jig, and to carry out the polymerization while keeping the cylinder as being supported by the jig. Using the dehydrated or deaerated monomer can contribute to preventing bubbles from forming.

As mentioned above, the polymerization may be carried out while the mono-layered or double-layered cylinder is placed in the hollow space of a jig, from the viewpoint of preventing deformation during polymerization. The jig is preferably shaped as having a hollow space in which the structure can be inserted, and the hollow space preferably has a profile similar to that of the structure. Since the structure corresponding to the clad region is formed in a cylindrical form in the present embodiment, it is preferable that also the jig has a cylindrical form. The jig can suppress deformation of the mono-layered or double-layered cylinder during the pressurized polymerization, and supports the cylinder so as to relax the shrinkage of the area corresponding to the core region with the progress of the pressurized polymerization. It is preferable that the jig has a hollow space having a diameter larger than the outer diameter of the mono-layered or double layered cylinder, and that the jig supports the cylinder corresponding to the clad region in a non-adhered manner. Since the jig has a cylindrical form in the present embodiment, the inner diameter of the jig is preferably larger by 0.1 to 40% than the outer diameter of the cylinder corresponding to the clad region, and more preferably larger by 10 to 20%.

Formation of bubbles can be prevented by cooling the obtained preform at a constant rate under controlling pressure subsequently to the end of polymerization for the core region. From the viewpoint of the pressure response of the core region, pressurized polymerization, such as polymerization carried out in a reactor vessel filled with a pressurized inert gas such as nitrogen gas, is desirable for producing the core region. However it is basically impossible to remove gas from the preform completely, and the rapid contraction of the polymer during cooling may produce cores of bubbles due to aggregation of the gas included in the polymer, and result in formation of bubbles. In order to avoid this, the cooling is desirably carried out at a controlled cooling rate of 0.001 to 3° C./min, and more desirably of 0.01 to 1° C./min. Cooling may be carried out stepwise according to contraction process of the polymer during approaching to Tg of the polymer, especially to Tg of the polymer forming the core region. In such a case, it is preferred that the cooling rate right after polymerization is high and is gradually decreased.

The preform obtained by the above mentioned process desirably has a uniform distribution of refractive-index, sufficient optical transparency, as few bubbles or macro-clearance as possible, and a high-smooth interface, which can reflect the light into the core, between the core and clad regions, in order to produce optical fibers having high performance in high productivity.

The preform produced by another process, such as those produced by melt-extruding pellets of a polymer such as polymethyl methacrylate into a rod-like shape or by pouring a molten polymer into a rod-like shape molding and heating polymer placed in the molding at a temperature higher than the melting point of the polymer so as to be subjected to a non-orientation treatment sufficiently, may be used in the present invention. The preforms produced by any processes can be used, as long as the preforms have a uniform distribution of refractive index, a sufficient optical transparency and as few bubbles or macro-clearance as possible.

Next, in the third step, the plastic optical fiber is produced by melt-drawing the preform.

FIG. 9 is a schematic sectional vies of a drawing apparatus applicable to the third step. The drawing apparatus shown in FIG. 9 comprises an arm 101, a universal joint 107 on the end of the arm 101, and a preform holder 108. They support a preform 109 in a hanging style. When the screw driver 103 is driven by a motor 104, the screw 102 rotates at a constant speed, the arm 101 descends, and the preform 109 is inserted into the heater 110. The preform 109 is heated in each compartment subsequently and is melted. The melted end of the preform 109 is cooled during going through a cooling room 111b, which is placed downstream of the heater 110, being sent cooled air by cooling fan 111a, is nipped between nipping portion of pulling rolls 115, and is drawn downward by the pulling rolls 115. One of the pulling rolls 115 is driven by a pulling motor 116 by which the downward pulling force is adjustable. The preform 109 is fed downward at a constant rate by the arm 101 and is drawn at a constant rate by the puling rolls 115, and therefore is drawn continuously to form an optical fiber 109'.

The drawing-axis is adjustable with the aid of an aligning device 105. Downward pulling speed of the preform 109 can be optimized by controlling the motor 116 by a computer 117 based on detected values obtained from the tension gauge 114a for detecting tensile force of the preform 109, a laser measuring gauge 114b for detecting diameter of the preform 109, and/or a distance counter 114c or measuring a drawn length.

As shown in FIG. 9, when the heater 110 is multistage, the temperature difference, which is needed to yield the effect of the present invention as described above, between the center and the peripheral portions can be created by controlling temperature inside of each compartment exactly. In order to control temperature inside of each compartment exactly, orifices 119 are desirably disposed between compartments neighboring each other, as shown in FIG. 9, so as to prevent an atmosphere in one compartment from leaking into an adjacent compartment.

For example, when the preform is formed of a material having a positive intrinsic birefringence, the preform may be heated so that the temperature decreases along a direction going from the center portion to the periphery portion gradually. In such a case, the preform may be fed into an upstream zone such as a first compartment whose temperature is high enough to heat the preform rapidly, subsequently fed into a next zone such as a second or another subsequent compartment whose temperature is high enough to enable the cylindrical preform to become drawn, to decrease in diameter gradually and to translate into conical form. Subsequently the preform may be fed into a downstream zone in which cold air is sent (the temperature difference against any heating zone is desirably not lower than 30° C.) and cooled rapidly while being drawn into fiber of a desired diameter. Being provided with cold air, the periphery portion may be cooled rapidly, and on the other hand, the center portion may be cooled insufficiently, so that a distribution of temperature is created in the core region.

On the other hands when the preform is formed of a material having a negative intrinsic birefringence, the preform may be heated so that the temperature decreases along a direction going from the periphery portion to the core region gradually. In such a case, the preform may be fed into an upstream zone such as a first compartment or both of a first and a second compartments, whose temperature is low, for example not higher than 30° C., enough not to preheat the preform in the upstream zone. Subsequently the preform may be fed into a next zone whose temperature is high enough to heat the periphery portion of the core region for a short time rapidly and to enable the preform to become drawn into fiber of a desired diameter, before the center portion of the core region is heated as well as the periphery portion. When the temperature of the cold air in the upstream zone is not lower than 30° C., the preform may be preheated and the sufficient difference in temperature can not be created.

In any case, after being drawn into fiber of a desired diameter, cooling may be carried out in order to avoid transformation during passing through the rolls.

The drawing temperature may be set depending on material of the preform, and in usual, the drawing temperature is desirably 180 to 250° C. The conditions for drawing such as temperature can be set depending on diameter of the preform, desired diameter of fiber or material of the preform. The optical fiber of the present invention has a birefringence index varying along a direction perpendicular to the center line, and in order to produce such an optical fiber, an electric furnace is desirably used for heating the preform when the temperature of the periphery portion is required to be sufficient higher than that of the center portion during drawing. Electric furnaces can heat the surface of the preform effectively, and create the sufficient temperature difference between in the periphery and the center portions. On the other hand, when the temperature of the center portion is required to be sufficient higher than that of the periphery portion during drawing, laser is desirably used. Lasers can heat the preform to the center portion of the preform sufficiently and rapidly. And after being heated rapidly, the preform is cooled rapidly, in particular cooled with cold air blown into, so that the sufficient temperature difference between in the periphery and the center portions can be created.

For keeping the linearity and the circularity of the fiber, it is preferable to draw the preform into fiber using a draw-spinning apparatus which has an aligning mechanism for keeping the center position constant.

The drawing tension can be set to 10 g or above in order to orient molten plastic as described in JPA No. hei 7-234322 (1995-234322), and preferably set to 100 g or below so that strain does not remain after the spinning as disclosed in JPA No. hei 7-234324 (1995-234324). It is also allowable to employ a method having a pre-heating step prior to the drawing as described in JPA No. hei 8-106015 (1996-106015).

The bending property and the edgewise pressure property of the fiber can be improved when the breaking stretch and the hardness of a raw fiber would be respectively within a range described in JPA No. hei 7-244220 (1995-244220). The transmission quality of the fiber can be improved when the fiber has an outer layer, having a low refractive index, which can function as a reflective layer, as described in JPA No. hei 8-54521 (1996-54521). The reflective layer may be produced by coating a low-refractive composition, which can also be used for a material of a clad region, to the surface after the preform such a PMMA rod is drawn into fiber of a desired diameter. Examples of coating-type clad region include "AC R220B" UV-curing type manufactured by Addison Clear Ware Company.

The plastic optical fiber after being processed in the third step can directly be subjected, without any modification, to various applications. The fiber may also be subjected to various applications in a form of having on the outer surface thereof a covering layer or fibrous layer, and/or in a form having a plurality of fibers bundled for the purpose of protection or reinforcement. For the case where a coating is provided to the element wire, the covering process is such that running the element wire through a pair of opposing dies which has a through-hole for passing the element fiber, filling a molten polymer for the coating between the opposing dies, and moving the element fiber between the dies. The covering layer is preferably not fused with the element fiber in view of preventing the inner element fiber from being stressed by bending. In the covering process, the element fiber may be thermally damaged typically through contacting with the molten polymer. It is therefore preferable to set the moving speed of the element fiber so as to minimize the thermal damage, and to select a polymer for forming the covering layer which can be melted at a low temperature range. The thickness of the covering layer can be adjusted in consideration of fusing temperature of polymer for forming the covering layer, drawing speed of the element fiber, and cooling temperature of the covering layer.

Other known methods for forming the covering layer on the fiber include a method by which a monomer coated on the optical member is polymerized, a method of winding a sheet around, and a method of passing the optical member into a hollow pipe obtained by extrusion molding.

Coverage of the element fiber enables producing of plastic optical fiber cable. Styles of the coverage include contact coverage in which plastic optical fiber is covered with a cover material so that the boundary of the both comes into close contact over the entire circumference; and loose coverage having a gap at the boundary of the cover material and plastic optical fiber. The contact coverage is generally preferable since the loose coverage tends to allow water to enter into the gap from the end of the cover layer when a part of the cover layer is peeled off typically at the coupling region with a connector, and to diffuse along the longitudinal direction thereof. The loose coverage in which the coverage and element fiber are not brought into close contact, however, is preferably used in some purposes since the cover layer can relieve most of damages such as stress or heat applied to the cable, and can thus reduce damages given on the element fiber. The diffusion of water from the end plane is avoidable by filling the gap with a fluid gel-form, semi-solid or powdery material. The coverage with higher performance will be obtained if the semi-solid or powdery material has both of a function for providing water diffusion and a function other than the water-diffusion-providing-function, such as functions for improving heat resistance, mechanical properties or the like.

The loose coverage can be obtained by adjusting position of a head nipple of a crosshead die, and by controlling a decompression device so as to form the gap layer. The thickness of the gap layer can be adjusted by controlling the thickness of the nipple, or compressing/decompressing the gap layer.

It is further allowable to provide another cover layer (secondary cover layer) so as to surround the existing cover layer (primary cover layer). The secondary cover layer may be added with flame retarder, UV absorber, antioxidant, radical trapping agent, lubricant and so forth, which may be included also in the primary cover layer so far as a satisfactory level of the anti-moisture-permeability is ensured.

While there are known resins or additives containing bromine or other halogen or phosphorus as the flame retarder, those containing metal hydroxide are becoming a mainstream from the viewpoint of safety such as reduction in emission of toxic gas. The metal hydroxide has crystal water in the structure thereof and this makes it impossible to completely remove the adhered water in the production process, so that the flame-retardant coverage is preferably provided as an outer cover layer (secondary cover layer) surrounding the anti-moisture-permeability layer (primary cover layer) of the present invention.

It is still also allowable to stack cover layers having a plurality of functions. For example, besides flame retardation, it is allowable to provide a barrier layer for blocking moisture absorption by the element fiber or moisture absorbent for removing water, which is typified by hygroscopic tape or hygroscopic gel, within or between the cover layers. It is still also allowable to provide a flexible material layer for releasing stress under bending, a buffer material such as foaming layer, and a reinforcing layer for raising rigidity, all of which may be selected by purposes. Besides resin, a highly-elastic fiber (so-called tensile strength fiber) and/or a wire material such as highly-rigid metal wire are preferably added as a structural material to a thermoplastic resin, which reinforces the mechanical strength of the obtained cable.

Examples of the tensile strength fiber include aramid fiber, polyester fiber and polyamide fiber. Examples of the metal wire include stainless wire, zinc alloy wire and copper wire. Both of which are by no means limited to those described in the above. Any other protective armor such as metal tube, subsidiary wire for aerial cabling, and mechanisms for improving workability during wiring can be incorporated.

Types of the cable include collective cable having element fibers concentrically bundled; so-called tape conductor having element fibers linearly aligned therein; and collective cable further bundling them by press winding or wrapping sheath; all which can be properly selected depending on applications.

The cables comprising the fibers of the present invention may have a higher tolerance for an axis misalignment than those of the previous cables. Thus, the cables can be used for butt connections, however, in such cases, optical connectors are desirably used at the ends, so as to fix the connection portions certainly. Various types of commercially available connectors such as a PN, SMA, SMI, F05, MU, FC or SC type connector can be used.

The optical member of the present invention is available as an optical fiber cable for use in a system for transmitting light signal, which system comprises various light-emitting element, light-switch, optical isolator, optical integrated circular, light-receiving element, other optical fiber, optical bus, optical star coupler, light signal processing device, optical connector for connection and so forth. Any known technologies may be applicable while making reference to "Purasuchikku Oputicaru Faiba no Kiso to Jissai (Basics and Practice of Plastic Optical Fiber)", published by N.T.S. Co., Ltd.; pages 110 to 127 of "NIKKEI ELECTRONICS" vol. 2001, 12, 3 or the like. The optical member of the present invention may be combined with any technology described in the above mentioned documents, and the combinations may form light transmission systems for short distance such as high-speed data communications or controls without electro magnetic wave. More specifically, such combinations may form internal wirings in computers or various digital equipments; internal wirings in vehicles or ships; optical links between optical terminals and digital equipments or between digital equipments; and indoor or interregional optical LANs in isolated houses, multiple houses, factories, offices, hospitals, schools.

Furthermore, the optical member of the present invention may be combined with any technique described in "HighUniformity Star Coupler Using Diffused Light Transmission", IEICE TRANS. ELECTRON., VOL. E84-C, No. 3, MARCH 2001, p. 339-344; or "HIKARI SHITOBASU GIJYUTSU NIYORU INTACONEKUSYON (Interconnections by optical sheet buses)" Journal of Japan Institute of Electronics Packaging Vol. 3, No. 6, 2000, p. 476-480; optical bus typically described in JPA Nos. 1998-123350, 2002-90571 or 2001-290055; optical branching/coupling device typically described in JPA No. 2001-74971, 2000-329962, 2001-74966, 2001-74968, 2001-318263 or 2001-311840; optical star coupler typically described in JPA No. 2000-241655; light signal transmission device and optical data bus system typically described in JPA No. 2002-62457, 2002-101044 or 2001-305395; light signal processor typically described in JPA No. 2002-23011; light signal cross-connection system typically described in JPA No. 2001-86537; optical transmission system typically described in JPA No. 2002-26815; or multi-function system typically described in JPA No. 2001-339554 or 2001-339555; any light guide, any optical turnout and crossing, any optical coupler, any optical compiling filter or any optical branching filter; and such combinations may form improved optical transmission systems using multiple sending and receiving.

Outside of the above mentioned applications, the optical member of the present invention may be used in the various technical fields such as lighting systems, energy transmitters, illuminations or sensors.

EXAMPLES

The present invention will specifically be described referring to the specific examples. It is to be noted that any materials, reagents, ratio of use, operations and so forth can be properly altered without departing from the spirit of the present invention. The scope of the present invention is therefore by no means limited to the specific examples shown below.

Example Nos. 1 to 9

Figure 6:
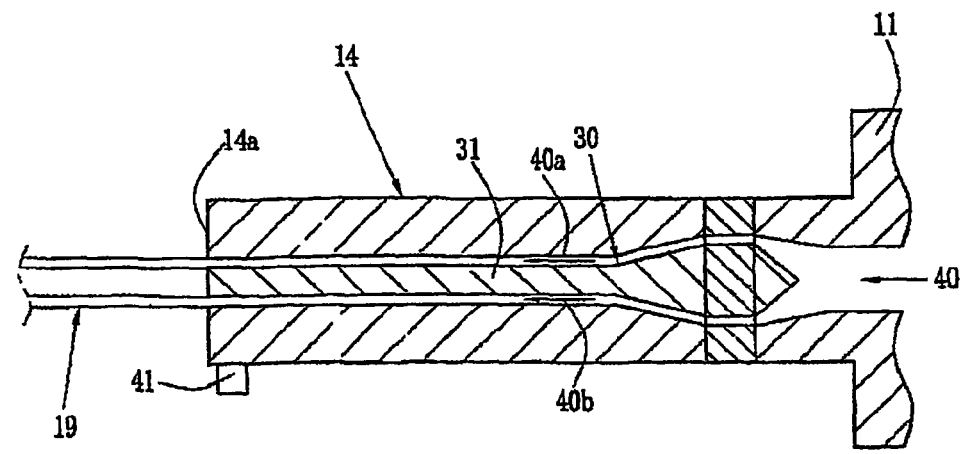
FIG. 6 is a schematic sectional view showing an exemplary configuration of a melt extrusion molding machine based on the inner sizing system available for the fabrication of the optical fiber in the present invention.

A hollow tube (pipe), having a thickness of 1 mm, a diameter of 20 mm, and a length of 1 m, was produced by extruding molten polyvinylidene fluoride (PVDF) with an inner-sizing-die-type melt-extrusion machine having a same construction as shown in FIG. 6. One end of the pipe was covered with a cap formed of PVDF, and a MMA composition shown below, which can produce a core region formed of negative birefringent PMMA, was poured into the hollow portion of the pipe.

| (MMA Composition) | |
|---|---|
| methyl methacrylate | 500 g |
| methyl azobisisobutyrate | 0.25 g |
| n-laurylmercaptan | 1.75 g |

After pouring, the polymerization of the composition was carried out stepwise, in particular, at 60° C. for 24 hrs, at 90° C. for 24 hrs and at 120° C. for 24 hrs while the pipe was placed in an oil-bath, and thus a preform was obtained.

(Drawing)

The obtained preform was drawn by a drawing machine comprising a ring-shaped electric furnace, having a same construction as shown in FIG. 9. The heating-zone of the furnace was five-stage, or in other words consisted of five compartments, as shown FIG. 9, plates 119, usually referred to as "orifice", were disposed jutting out between compartments such that the atmospheres in the compartments hardly leaked in the adjacent compartments. The air of 20° C. was always sent into both of the first and second compartments; the temperature of the third compartment was set to nine levels, in particular, 205° C., 210° C., 215° C., 220° C., 225° C., 230° C., 235° C., 240° C. or 245° C.; and the temperatures of the fourth and fifth compartments were always set to 170 and 140° C. respectively while the preform was drawn. The samples, or in other words fibers having an outer diameter of 1 mm and a length of 50 m, of Example Nos. 1 to 9 were thus obtained.

The temperature-difference, which was created inside of the preform during the above drawing-process, was investigated specifically by using a model test. For the model test, a preform, into which two thermocouples were incorporated, was prepared. One of them was disposed at the center portion of one plane perpendicular to the longitudinal axis and the other was disposed at the periphery portion of the plane. The preform was drawn in the same manner as Example No. 8, in particular under the condition that the temperature in the third compartment was set to 240° C., and the thermocouple temperatures were measured until the rupture of fiber was occurred because the thermocouples reached the drawn-cone portion which is a level as shown with A1 in FIG. 5 or the neighborhood area. And the measurement showed that the temperature of the periphery portion was 213° C., the temperature of the center portion was 190° C. and the temperature difference between them was 23° C.

(Evaluation of the Obtained Fiber; Optical Fiber Bandwidth)

Figure 10:
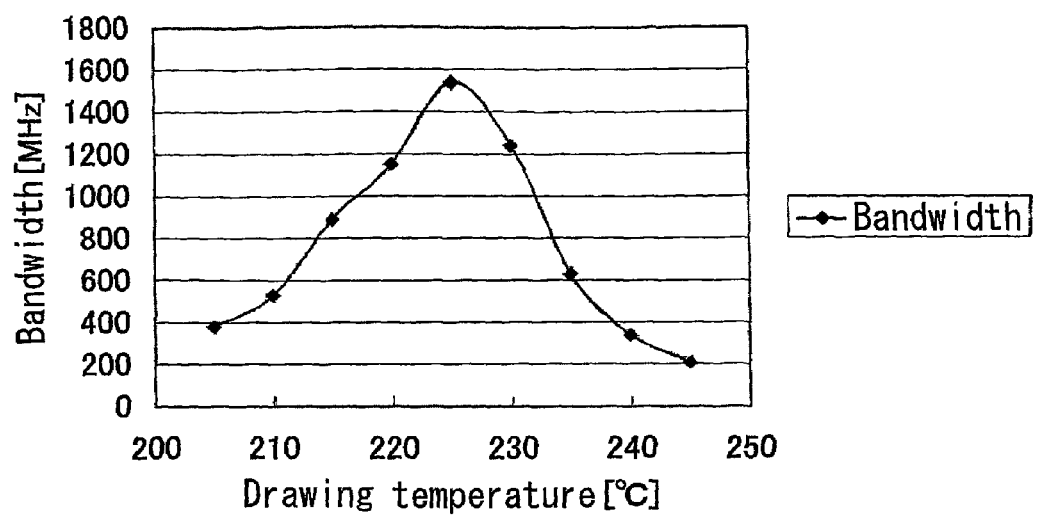
FIG. 10 is a graph showing a relationship between drawing temperature and bandwidth of the samples produced in Examples.

Pulsed light, having a half breadth of 100 pico seconds, emitted from 650 nm-LED as a light source, was collected by an objective lens having numerical apertures of 0.5, and was led into the inlet end of each of the obtained optical fibers. The outgoing light from the outlet end, which was 50 m far from the inlet end, was detected with sampling oscilloscope. The each bandwidth was calculated by transforming a half breadth of a wave shape to a response frequency. The obtained results are shown in Table 1. And each optical fiber bandwidth was plotted versus drawing-temperature in FIG. 10. From FIG. 10, it may be understood that the optical fiber bandwidth varies depending on the drawing temperature and the maximum frequency is obtained when the drawing temperature is set to about 225° C.

(Evaluation of the Obtained Fiber; Birefringence-Distribution)

Figure 11:
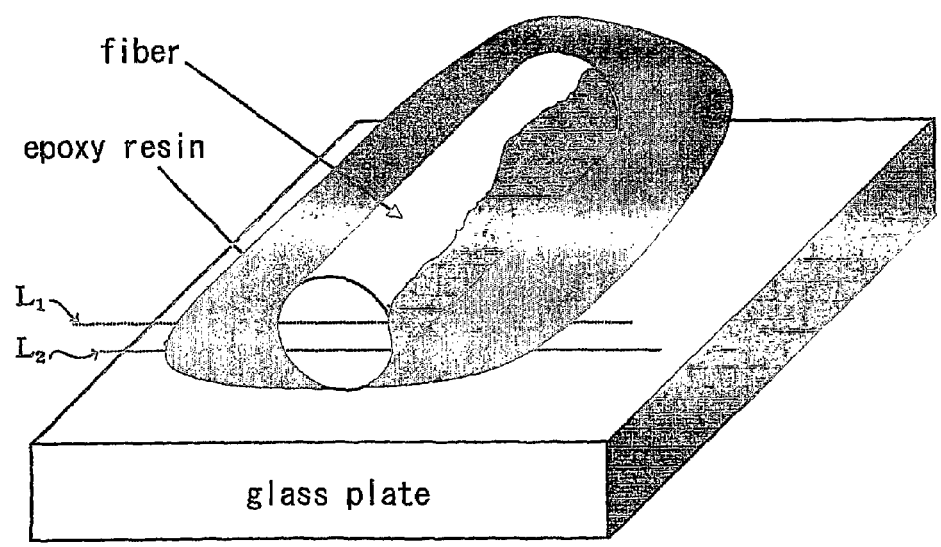
FIG. 11 is a schematic view used for explanation of the method by which the samples for birefringence index evaluation were prepare in Examples.

The birefringence-distribution along a direction going from a center line, which is parallel to the longitudinal axis, to the periphery portion vertically was evaluated by a method described below. It is tore noted that in fact, the distribution of retardation, or in other words Δn×d, where Δn (=nx−ny) is a birefringence index and d is a thickness of the sample, was evaluated. At fist, 10 m samples of the obtained optical fibers were prepared respectively. Each sample was placed on a glass plate having a thickness of 1 mm, was covered with epoxy resin and was adhered to the plate as shown in FIG. 11. Next, polishing was carried out from the epoxy-resin-side, or in other words from the upside in FIG. 11, to the level of the center line, which is shown with a dashed line $L_1$. And another glass plate, having a thickness of 1 mm, was place on the polished face of the sample and was fixed with epoxy resin. And polishing was carried out from the opposite glass-plate-side, or in other words from the downside in FIG. 11. As polishing proceeded, the downside glass plate was cut off, and the sample was polished by the level shown with a dashed line $L_2$ in FIG. 11, so that the thickness of the sample resulted in 0.1 mm. By the above described steps, samples of the fibers having a thickness of 0.1 mm being placed on a glass plate were obtained respectively. These samples were examined under a polarization microscope ("BX51" manufacture by Olympus) having a thick-berek-compensator, U-CTB, and their retardation-distributions were evaluated with the observed colors. From the observations, it could be understood that the retardations of any samples varied along a direction going from the center line portion to the interface between the core and clad regions vertically. The absolute values of the retardation were shown in Table 1.

(Evaluation of the Obtained Fiber; Temperature and Humidity Stability)

The amount of light loss at 650 nm was measured for each of the obtained optical fibers by a cut-back method soon after being produced. Next, each of them was left in an atmosphere of 70° C.-90% RH for 1000 hrs. and then the amount of light loss was measured again. The difference between the two amounts was regarded as a light-loss change. The light-loss changes of the obtained fibers were shown in Table 1.

As shown in table 1, it may be understood that as the birefringence index varied more significantly, the wider bandwidth was obtained; or in other words, that as the absolute value of the retardation-difference was larger, the more remarkable distribution in birefringence index in any plane perpendicular to the longitudinal axis was created, and the GI-type optical fiber having higher light-transmitting properties was obtained.

Comparative Example 1

A preform was produced in the same manner as Example 1.

(Drawing)

The obtained preform was drawn by a drawing machine comprising a ring-shaped electric furnace, having a same construction as shown in FIG. 9. The temperatures of the first and second compartments were set to 140 and 180° C. respectively, the temperature of the third compartment was set to 240° C. and the temperatures of the fourth and fifth compartments were set to 170 and 140° C. respectively while the preform was drawn. A sample, or in other words a fiber having an outer diameter of 1 mm and a length of 50 m, of Comparative Example No. 1 was thus obtained.

Optical fiber bandwidth, birefringence index distribution and temperature and humidity stability of the obtained fiber were evaluated in the same manner as Example Nos. 1 to 9. The obtained results are shown in Table 1. It is to be noted that the sample of Comparative Example No. 1 had retardation however, and the amount of the retardation was uniform and no distribution of retardation was found.

Comparative Example No. 2

A GI-type plastic optical fiber was produced in the same manner as Example No. 4 described in Japanese Patent No. 3332922. In the process, which is known as a process for producing GI-type optical fibers, a dopant was used and the distribution in refractive index was created based on the distribution in concentration of the dopant. The properties of the obtained optical fiber were evaluated in the same manner as described above.

TABLE 1

| Sample No. | Drawing-temperature (third compartment) | Bandwidth (MHz) | Retardation (nm) in central portion → in periphery portion near to clad region | Light loss (dB/km) |
| --- | --- | --- | --- | --- |
| Example 1 | 205° C. | 380 | 380→370 | 15 |
| Example 2 | 210° C. | 530 | 380→360 | 18 |
| Example 3 | 215° C. | 890 | 370→350 | 16 |
| Example 4 | 220° C. | 1150 | 360→340 | 19 |
| Example 5 | 225° C. | 1540 | 350→310 | 14 |
| Example 6 | 230° C. | 1240 | 330→280 | 17 |
| Example 7 | 235° C. | 630 | 280→250 | 12 |
| Example 8 | 240° C. | 340 | 240→230 | 17 |

TABLE 1-continued

| Sample No. | Drawing-temperature (third compartment) | Bandwidth (MHz) | Retardation (nm) in central portion → in periphery portion near to clad region | Light loss (dB/km) |
|---|---|---|---|---|
| Example 9 | 245° C. | 210 | 150→140 | 18 |
| Comparative Example 1 | 240° C. | 105 | 220→210 | 16 |
| Comparative Example 2 | 240° C. | 1430 | 290→270 | 260 |

INDUSTRIAL APPLICABILITY

According to the present invention, refractive index profile can be created in any section perpendicular to the light propagating direction by creating birefringence-distribution in any section parallel to the longitudinal axis, and therefore GI-type POF can be produced without using a dopant, or by using a uniform composition. The optical fibers, which are produced by the process of the present invention, are excellent in bandwidth, long-term stability and temperature-humidity stability.

The invention claimed is:

1. An optical plastic fiber comprising a core region and having a center line along a longitudinal axis of the fiber,
in any plane perpendicular to the center line, a refractive index of the core region increasing along a direction going from a periphery portion to the center line, and
in any plane parallel to the center line and containing the center line, a birefringence index varying along a direction going from the center line to a periphery portion perpendicular to the center line;
wherein molecules in the core region are aligned along the longitudinal axis, and a degree of the alignment varies along a direction going from the center line to a peripheral portion perpendicular to the center line, and the variation of the alignment degree causes a refractive index profile in the core.

2. The optical plastic fiber of claim 1, wherein the core region is formed of a material having a positive intrinsic birefringence; and in any plane parallel to a propagating direction and containing the center line, an absolute value of a birefringence index $\Delta n$, $\Delta n = n_x - n_y > 0$, where $n_x$ is a refractive index parallel to the longitudinal axis and $n_y$ is a refractive index perpendicular to the longitudinal axis, increases along a direction going from the center line to a periphery portion perpendicular to the center line.

3. The optical plastic fiber of claim 1, wherein the core region is formed of a material having a negative intrinsic birefringence; and in any plane parallel to a propagating direction and containing the center line, an absolute value of a birefringence index $\Delta n$, $\Delta n = n_x - n_y < 0$, where $n_x$ is a refractive index parallel to the longitudinal axis and $n_y$ is a refractive index perpendicular to the longitudinal axis, decreases along
a direction going from the center line to a periphery portion perpendicular to the center line.

4. The optical plastic fiber according to claim 1, wherein the core region is formed of a uniform composition.

5. The optical plastic fiber according to claim 1, wherein light loss is not greater than 250 dB/km.

6. The optical plastic fiber according to claim 2, wherein light loss is not greater than 250 dB/km.

7. The optical plastic fiber according to claim 3, wherein light loss is not greater than 250 dB/km.

8. The optical plastic fiber according to claim 4, wherein light loss is not greater than 250 dB/km.

9. The optical plastic fiber according to claim 5, wherein light loss is not greater than 250 dB/km.

10. The optical plastic fiber according to claim 2, wherein the core region is formed of a uniform composition.

11. The optical plastic fiber according to claim 3, wherein the core region is formed of a uniform composition.

12. A process for producing an optical plastic fiber comprising drawing a preform comprising at least one region formed of a material having an intrinsic birefringence into fiber while passing the preform through at least two zones where a temperature is set to be different each other, thereby creating a temperature-difference of 5° C. or larger between a center portion and a peripheral portion of the preform before the preform is drawn into fiber.

* * * * *